(12) United States Patent
Sorvino et al.

(10) Patent No.: US 9,140,278 B2
(45) Date of Patent: Sep. 22, 2015

(54) ANTI-ROTATION ISOLATOR

(75) Inventors: Alfred Sorvino, Vail, AZ (US); Donald N. McDuffee, Vail, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/619,487

(22) Filed: Sep. 14, 2012

(65) Prior Publication Data

US 2014/0079469 A1   Mar. 20, 2014

(51) Int. Cl.
*F16C 11/12*   (2006.01)
*F16B 5/00*   (2006.01)
*F16C 11/06*   (2006.01)

(52) U.S. Cl.
CPC . *F16B 5/00* (2013.01); *F16C 11/06* (2013.01); *Y10T 403/32181* (2015.01); *Y10T 403/45* (2015.01)

(58) Field of Classification Search
USPC ............. 403/74, 111, 166, 220, 223, 229; 285/114, 223, 224, 229, 282, 298; 267/136, 140.11, 148; 248/406.1, 418, 248/568, 570; 52/167.1, 167.4, 167.6, 52/167.8; 464/84, 101, 160
See application file for complete search history.

(56) References Cited

U.S. PATENT DOCUMENTS

| | | | | | |
|---|---|---|---|---|---|
| 3,029,094 | A | * | 4/1962 | Parlasca et al. | 285/114 |
| 3,120,745 | A | * | 2/1964 | Curt | 464/76 |
| 3,204,913 | A | * | 9/1965 | Lawrence et al. | 267/148 |
| 3,527,481 | A | * | 9/1970 | Lewis | 285/114 |
| 3,666,296 | A | * | 5/1972 | Fischetti | 285/114 |
| 4,586,689 | A | * | 5/1986 | Lantero | 248/570 |
| 5,149,066 | A | * | 9/1992 | Snaith et al. | 267/136 |
| 5,466,085 | A | * | 11/1995 | Sheldon et al. | 403/157 |

* cited by examiner

*Primary Examiner* — Daniel P Stodola
*Assistant Examiner* — Josh Skroupa

(57) ABSTRACT

A connection joint includes a first plate (186, 286), a second plate (182, 282), and connection members (184, 284). The connection members are coupled to the first plate and the second plate and positioned between the first plate and the second plate. The connection members are configured to resist rotation of the first plate with respect to the second plate around a first axis and allow a compression or expansion of the first plate with respect to the second plate on the first axis.

20 Claims, 5 Drawing Sheets

ANTI-ROTATION ISOLATOR

GOVERNMENT RIGHTS

The U.S. Government may have certain rights in this invention as provided for by the terms of Contract No. N0024-07-C-5437.

TECHNICAL FIELD

This disclosure is generally directed to systems that have components that rotate with respect to other components. More specifically, this disclosure is directed to an anti-rotation isolator.

BACKGROUND

In a variety of settings, one component may rotate with respect to another. In such settings, it may be desirable to resist undesired rotational forces.

SUMMARY

This disclosure provides a system with an anti-rotation isolator.

According to an embodiment, a connection joint includes a first plate, a second plate, and connection members. The connection members are coupled to the first plate and the second plate and positioned between the first plate and the second plate. The connection members are configured to resist rotation of the first plate with respect to the second plate around a first axis and allow a compression or expansion of the first plate with respect to the second plate on the first axis.

Certain embodiments may provide various technical advantages depending on the implementation. For example, a technical advantage of some embodiments may include the capability to resist rotation between two respective bodies along an axis while allowing compression and expansion on the axis. A technical advantage of other embodiments may include the capability resist rotation along a first axis and allow tilt on another axis perpendicular to the first axis. Yet another technical advantage may include the capability for providing a void through a rotation limiting structure.

Although specific advantages are above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
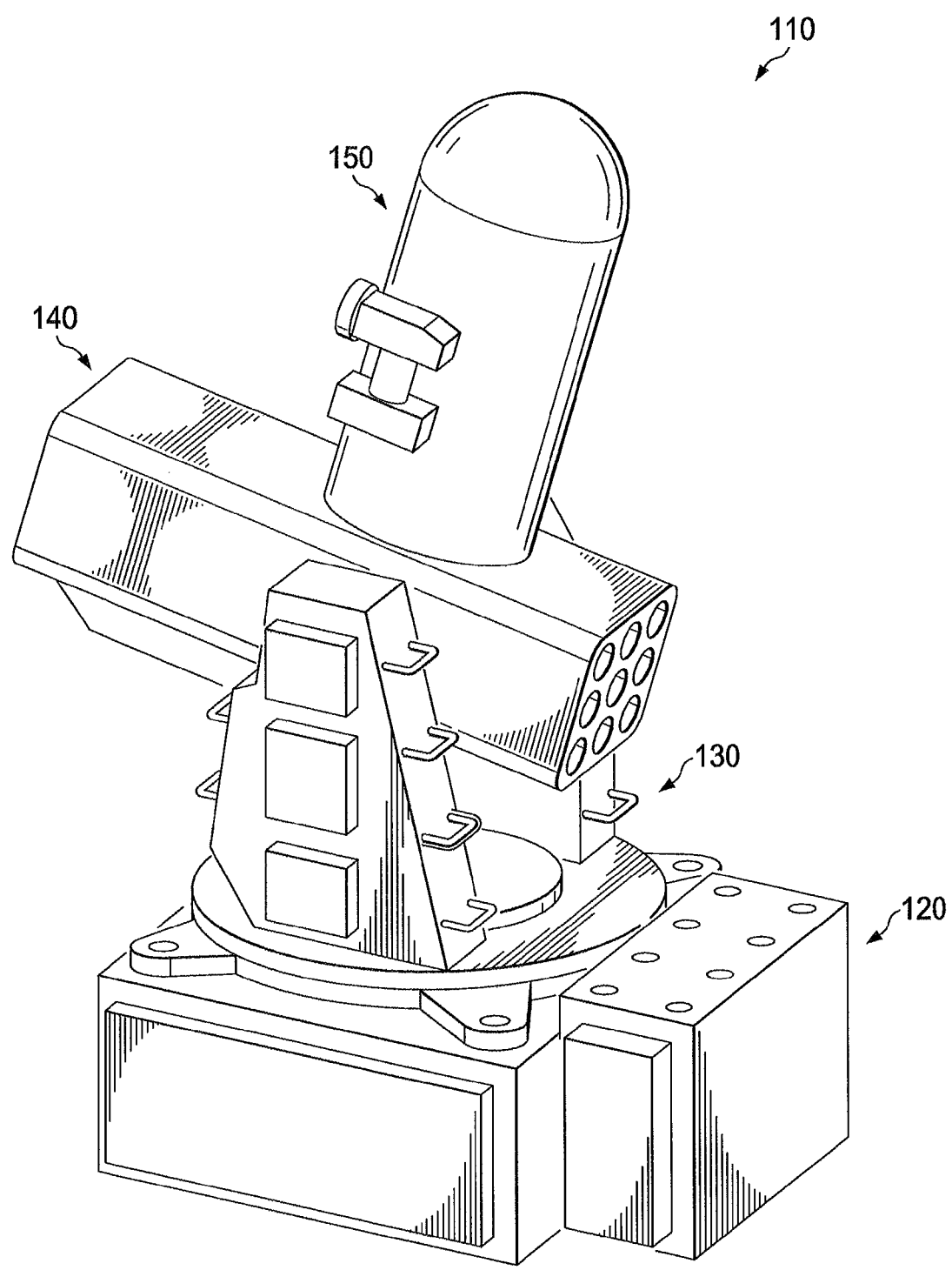
FIG. 1 illustrates an environmental view of an example system in which embodiments of the disclosure may be utilized.
Figure 2:
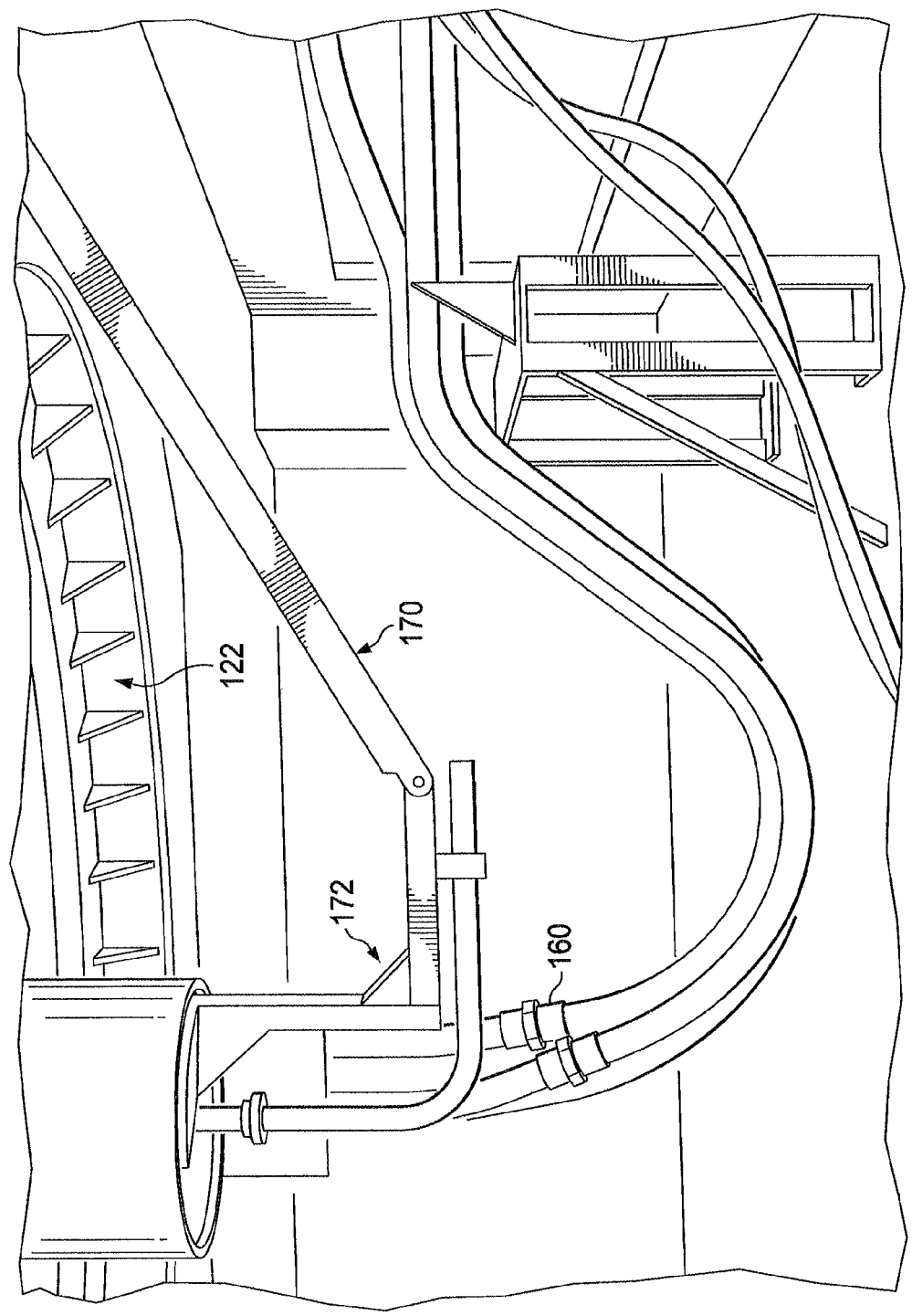
FIG. 2 show a conventional view inside of the base of FIG. 1.

FIG. 1 illustrates an environmental view of an example system 110 in which embodiments of the disclosure may be utilized. In particular, the example system 110 of FIG. 2 is a SeaRAM (Sea Rolling Airframe Missile) weapon system. As will be recognized by one of ordinary skill in the art, the SeaRAM generally includes a base 120, a turret 130, weapons 140, and radar equipment 150. The base 120 is generally fixed to, for example, a ship. A variety of bearings exist between the base 120 and the turret 130 to allow the turret 130 to rotate with respect to the base 120. The weapons 140 (shown here with 11 missiles) and radar equipment 150 generally rotate with the turret 140. In operation, the turret, 130, weapons 140, and radar equipment 150 are configured to rotate back and forth. Further details of operation of example system 110 are not provided as such details will become apparent to one of ordinary skill in the art.

Although example system 110 in FIG. 1 is shown, it should be understood that the invention is not intended as being limited to the example system 110. Rather, other systems may avail from teachings of the disclosure, including other military applications such as the Phalanx Close-In Weapon System (CIWS) and the Rolling Airframe (RAM) guided missile system. Yet other systems, including non-military systems applications, may also avail from teachings of the disclosure. Such other systems are discussed below with reference to FIG. 5.

FIG. 2 show a conventional view inside of the base 120 of FIG. 1. In order to power the equipment on top of the base 120, namely radar equipment 150, pneumatic waveguide lines 160 are fed-up to the rotating turret 130 (not seen from this view). Although a bearing support allows rotation at an interface between the base 120 and the rotating turret 130, it is desirable to keep the pneumatic waveguide lines 160 from being subjected to torque forces of the rotating turret 130. Accordingly, the conventional approach has involved utilizing a torque arm 170 coupled to an upper portion 122 of the base 120. The torque arm 170 may also include a torque bracket 172. This conventional design protects the waveguide lines 160, but only provides for a limited rotation of the turret 130, for example, on the order of 155 degrees. If a desired rotation is larger than the 155 degrees, the configuration of FIG. 2 is no longer feasible. Given such concerns, certain embodiments of the disclosure provide a configuration that allows an expanded rotation of the turret 130.

Figure 3:
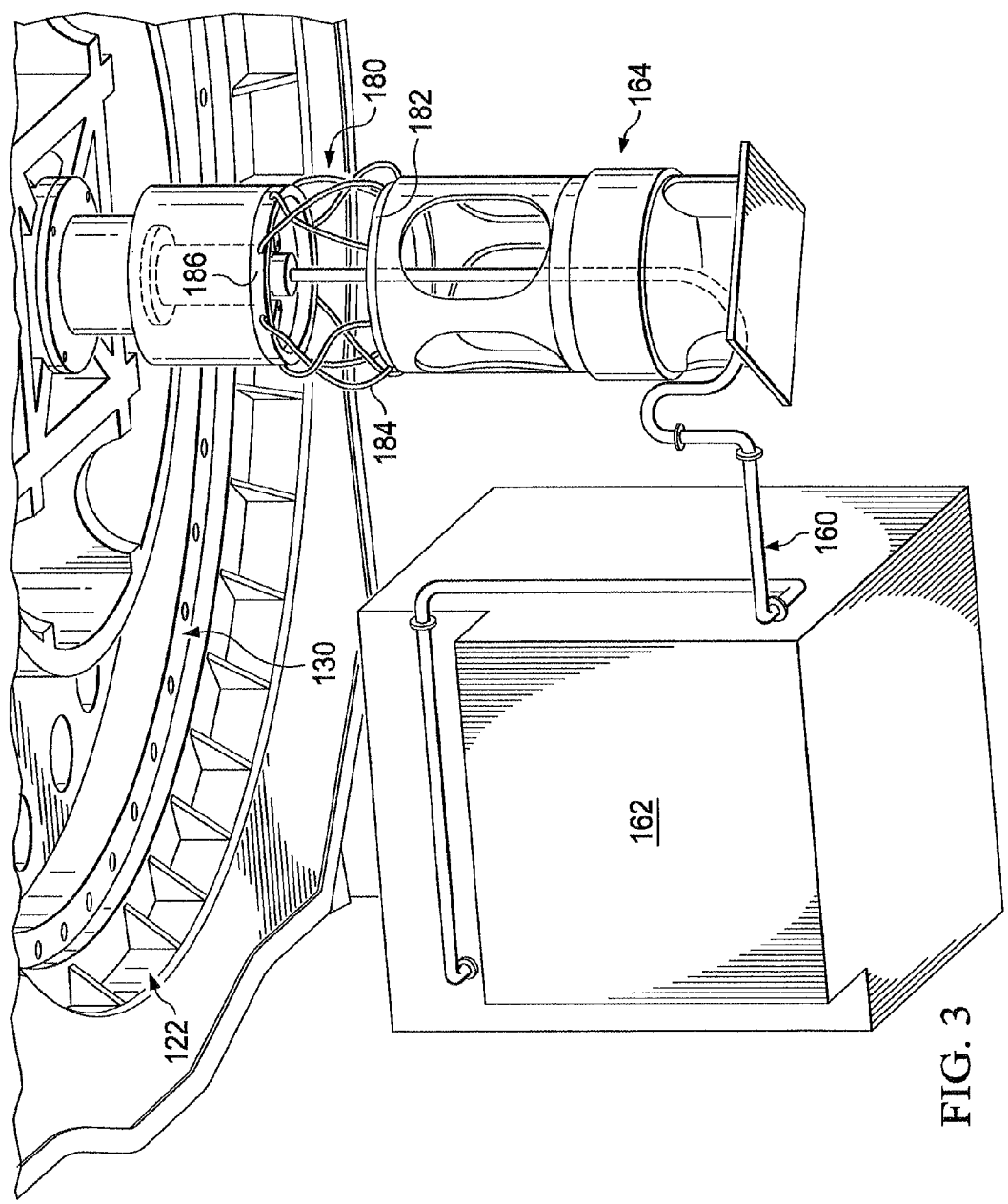
FIG. 3 shows a schematic view inside of the base, according to an embodiment of the disclosure.

FIG. 3 shows a schematic view inside of the base 120, according to an embodiment of the disclosure. Extending from a waveguide control box 162 is waveguide line(s) 160 (which may be one or several lines). The waveguide lines 160 have a small s-like curve before entering a waveguide assembly 164. The waveguide assembly 164 is fixedly coupled to the base 120.

Coupled to the waveguide assembly 164 is a flexible joint 180 that is configured to prevent rotation between a bottom plate 182 and a top plate 186 of the flexible joint 180 while allowing other degrees of freedom. For example, assuming the z-axis is the axis from which rotation is prevented, a compression and expansion in the z-axis is provided. Additionally, rotation is allowed in the x-axis and the y-axis such that the top plate 186 is allowed to tilt with respect to the bottom plate 182. As will be described with reference to FIG. 4, connection members 184 facilitate the anti-rotation feature in the above-referenced z-axis while allowing other degrees of freedom.

Mounted on top of the top plate 186 is equipment, which may allow rotation, for example, using any suitable structures such as bearings. Also shown is the upper portion 122 of the base 120 and the rotating turret 130 referenced above. As briefly mentioned above, the rotating turret 130 may sit on a plurality of bearings to allow rotation with respect to the base 120. In operation, the rotating turret 130 and other associated equipment may turn approximately 100 degrees per second in one direction or the other.

In the configuration shown in FIG. 3, the flexible joint 180 protects the waveguide lines 160 from rotational forces of the upper equipment while allowing shock absorption type qualities due to movement of the upper equipment. For example, rotational torque may arise for a variety of reasons; however, upon a rational force being imparted on to the top plate 186, the rotational force is not further translated to the bottom plate 182. Nonetheless, compression and expansion may be allowed as well as tilt. As a non-limiting example, in one configuration 4.3 inches of expansion and 5.55 inches of expansion may be allowed to occur in the configuration of the flexible joint 180 of FIG. 3.

Referring back to both FIGS. 2 and 3, by removing the torque arm 170 and the torque bracket 172 of FIG. 2 and replacing it with the configuration of the flexible joint 180 of FIG. 3, the turret 130 of FIG. 1 is allowed a much larger rotation. As a non-limiting example, the turret 130 may be allowed to rotate 171 degrees or more in both directions.

Further details of the operation of the flexible joint 180 are provided below with reference to FIG. 4.

Figure 4:
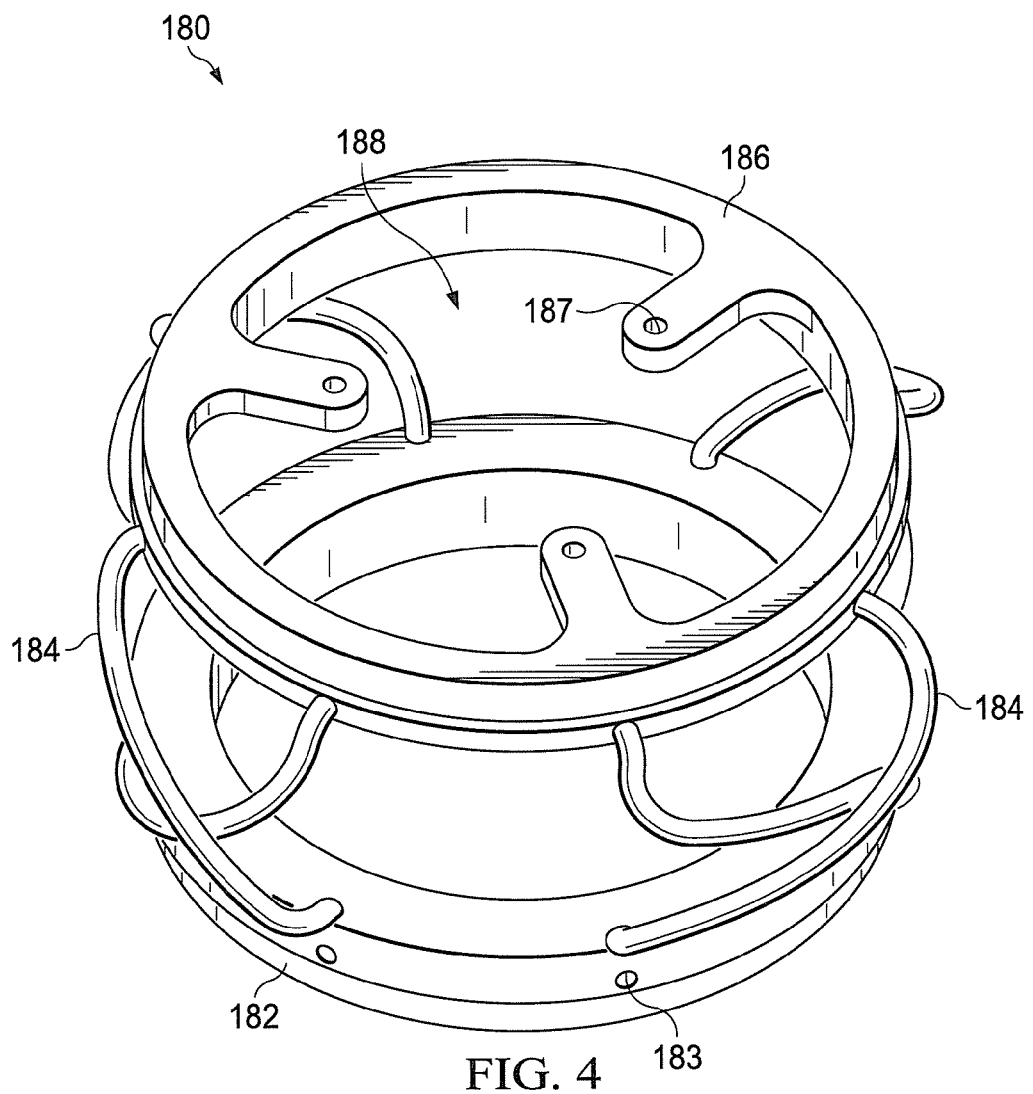
FIG. 4 shows another view of the flexible joint, according to an embodiment of the disclosure.

FIG. 4 shows another view of the flexible joint 180, according to an embodiment of the disclosure. The flexible joint 180 in the configuration of FIG. 4 includes a bottom plate 182, a top plate 186, and a plurality of connection members 184. The configuration of these components provides for a void 188 that can allow passage of other items, for example, the pneumatic waveguide lines 160 referenced above.

The connection members 184 are arranged as four sets of pairs. Each pair has a criss-crossed, x-wire or cross-wire design. In operation, upon an attempt to rotate one of the plates 186 with respect to the other plate 182, one of a pair of connection members 184 goes into compression and the other goes into expansion. All the pairs are doing the same thing. The combined forces (four compressed connection members 184 and four tensioned connection members 184) provides a combined force that resists rotation. In particular configurations, the anti-rotation feature may substantially limit rotation to less than one degree. Although the connection members 184 are shown in pairs in this configuration, in other configurations, the connection members 184 may not be in pairs.

As referenced above, in particular configurations, while resisting rotation, the flexible joint 180 allows other degrees of freedom. For example, assuming the z-axis is prevented from rotating, a compression and expansion in the z-axis may still be provided. Additionally, rotation is allowed in the x-axis (a tilt axis) and the y-axis (another tilt axis). To facilitate these freedoms, the connection members 184 are curvilinear between the bottom plate 182 and the top plate 186. In some configurations, the connection members 184 may slightly bend in allowing the tilts, compression, and expansion.

In particular configurations, the flexible joint 180 may be made of a stainless steel. In other configurations, the flexible joint 180 may be made of other materials including, but not limited to, plastics or composites. Additionally, a variety of changes may be made to the flexible joint 180 depending on the application. For example, the flexible joint 180 may be made taller or wider. Additionally, the flexible joint 180 may be made to have a larger diameter. Yet additionally, thicker diameter connection members 184 may be utilized. Moreover, more than or less than eight connection members 184 may be utilized.

To facilitate connection of another structure to either the bottom plate 182 or the top plate 186, any suitable configuration may be utilized. For example, as shown in FIG. 4, the top plate 186 includes mounting portions 187. Additionally, the bottom plate 182 includes mounting cutouts 183.

Although a particular example use has been described above with reference to FIG. 1, a variety of other uses may avail from teachings of this disclosure. Non-limiting examples of such other uses are provided below with reference to FIG. 5.

Figure 5:
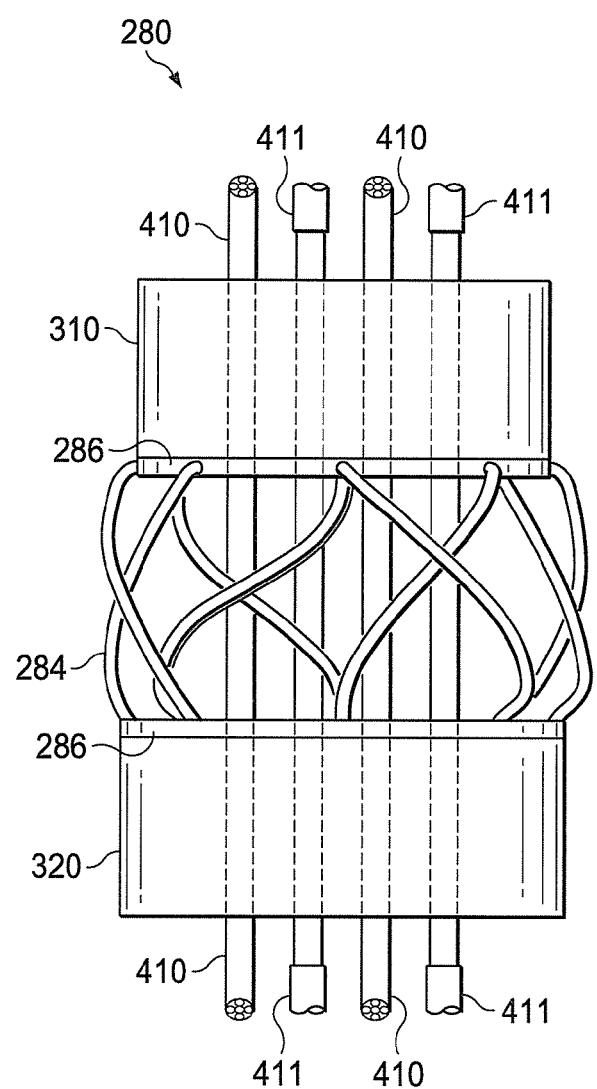
FIG. 5 illustrates additional aspects of a flexible joint, according to embodiments of the disclosure.

FIG. 5 illustrates additional aspects of a flexible joint 280, according to embodiments of the disclosure. The flexible joint 280 may be similar or different to the flexible joint 180 of FIGS. 3 and 4. Similar to the flexible joint 180 of FIGS. 3 and 4, the flexible joint 280 includes a plurality of connection members 284, a bottom plate 282, and a top plate 286. The connection members 284 are curvilinear between the top plate 286 and the bottom plate 282 and are shown in a criss-crossed arrangement. Additionally, although not clearly seen from this view, a center of the joint may be void similar to the void 188 of FIG. 4.

Connected to the top plate 286 is a first structure 310. Connected to the bottom plate 282 is a second structure 320.

Similar to that referenced above, in particular configurations, the flexible joint 280 may have an anti-rotation feature. Additionally, while resisting rotation, the flexible joint 280 may allow other degrees of freedom. For example, assuming the z-axis is prevented from rotating, a compression and expansion in the z-axis may still be provided. Additionally, rotation is allowed in the x-axis (a tilt axis) and the y-axis (another tilt axis). Additionally, in certain configurations, a plurality of flexible joints 280 may be stacked upon one another where each flex joint assists the anti-rotation feature.

The first structure 310 and the second structure 320 may be nearly any structure. As a first example, the first and second structure may correspond to a building where the flexible joint 280 is used to allow minimal movement while resisting rotation. Such a configuration, for example, would be beneficial for earthquake prone buildings. In such configurations, another material or structure may fill the void. As a non-limiting example, the flexible joint 280 may be a reinforcement structure for another material.

As another example, the first structure 310 and the second structure 320 may correspond to configurations in oil and gas production including, but not limited to, drilling platforms. In such configurations, electrical conductors 410 and pneumatic/hydraulic lines 411 may need to be positioned through the flexible joint 280 with minimized rotation and shock-absorption type qualities between the respective first structure 310 and the second structure 320.

As yet another example the first structure 310 and the second structure 320 may correspond to robotic joints for manipulators and sensors that need anti-rotation and shock-absorbing type features.

As yet another example, the first structure 310 and the second structure 320 may be utilized in biomedical scenarios. For example, the flexible joint 280 may serve as a substitute disc within the spine of a patient with deteriorated discs. In such a scenario, the central void may allow for passage of critical spinal features of the pateint's body.

In certain scenarios, a force which begins as a rotational force may be partially translated to forces that are controlled through allowed movement in the degrees of freedom that are allowed.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connection joint comprising:
a first plate,
a second plate, and
connection members coupled to the first plate and the second plate, the connection members arranged in pairs, each pair of connection members having connection members that are criss-crossed, the connection members configured to:
resist rotation of the first plate with respect to the second plate around a first axis with one of the connection members in each pair going into tension while another of the connection members in each pair goes into compression, and
allow a compression or expansion of the first plate with respect to the second plate along the first axis;
wherein the connection members are curvilinear from the first plate to the second plate.

2. The connection joint of claim 1, wherein a configuration of the first plate, the second plate, and the connection members provides a void adjacent the first axis.

3. The connection joint of claim 1, wherein the connection members are further configured to allow a tilt or rotation of the first plate with respect to the second plate in second and third axes orthogonal to the first axis.

4. The connection joint of claim 1, wherein the connection joint is configured for stacking on another connection joint.

5. The connection joint of claim 1, wherein the connection members are configured to allow less than one degree of rotational movement of the first plate with respect to the second plate around the first axis.

6. The connection joint of claim 1, wherein the connection members are arranged as four sets of pairs.

7. The connection joint of claim 1, wherein the connection members are positioned between the first plate and the second plate.

8. The connection joint of claim 1, wherein the connection members are configured to allow both compression and expansion of the first plate with respect to the second plate along the first axis.

9. A system comprising:
a first structure,
a second structure,
a first plate coupled to the first structure,
a second plate coupled to the second structure, and
connection members coupled to the first plate and the second plate, the connection members arranged in pairs, each pair of connection members having connection members that are criss-crossed, the connection members configured to:
resist rotation of the first plate with respect to the second plate around a first axis with one of the connection members in each pair going into tension while another of the connection members in each pair goes into compression, and
allow a compression or expansion of the first plate with respect to the second plate along the first axis;
wherein the connection members are curvilinear from the first plate to the second plate.

10. The system of claim 9, wherein:
a configuration of the first plate, the second plate, and the connection members provides a void adjacent the first axis, and
the system further comprises electrical or fluid conduits traversing from the first structure through the void to the second structure.

11. The system of claim 9, wherein the connection members are further configured to allow a tilt or rotation of the first plate with respect to the second plate in second and third axes orthogonal to the first axis.

12. The system of claim 9, wherein the connection members are configured to allow less than one degree of rotational movement of the first plate with respect to the second plate around the first axis.

13. The system of claim 9, wherein the connection members are positioned between the first plate and the second plate.

14. The system of claim 9, wherein the connection members are configured to allow both compression and expansion of the first plate with respect to the second plate along the first axis.

15. The system of claim 9, wherein the first and second structures are associated with a building.

16. The system of claim 9, wherein the first and second structures are associated with a military weapon.

17. The system of claim 9, wherein the first and second structures are associated with a hydrocarbon production system.

18. A method comprising:
resisting rotation of a first plate with respect to a second plate around a first axis using multiple connection members coupled to the first plate and the second plate, the connection members arranged in pairs, each pair of connection members having connection members that are criss-crossed; and
allowing a compression or expansion of the first plate with respect to the second plate along the first axis;
wherein resisting the rotation of the first plate with respect to the second plate comprises one of the connection members in each pair going into tension while another of the connection members in each pair goes into compression; and
wherein the connection members are curvilinear from the first plate to the second plate.

19. The method of claim 18, wherein the connection members allow a tilt or rotation of the first plate with respect to the second plate in second and third axes orthogonal to the first axis.

20. The method of claim 18, wherein the connection members allow less than one degree of rotational movement of the first plate with respect to the second plate around the first axis.

\* \* \* \* \*